Patented Sept. 13, 1932

1,876,920

UNITED STATES PATENT OFFICE

MAX HAGEDORN, WALTER ZIESE, AND BERTHOLD REYLE, OF DESSAU IN ANHALT, AND RUDOLF BAUER, OF COLOGNE-DEUTZ, GERMANY, ASSIGNORS TO I. G. FARBENINDUSTRIE AKTIENGESELLSCHAFT, OF FRANKFORT-ON-THE-MAIN, GERMANY

MANUFACTURE OF CARBOHYDRATE DERIVATIVES

No Drawing. Application filed April 25, 1930, Serial No. 447,422, and in Germany May 1, 1929.

Our present invention relates to the manufacture of carbohydrate compounds and more particularly to ethers derived from carbohydrates and alkylene oxides.

One of its objects is to provide in a single operation such ethers which are soluble in organic solvents and even in water. Another object of our invention is to transform the said ethers in ether-esters. Other features of our invention may be seen from the specification following hereafter.

According to our invention, such carbohydrate compounds which are readily soluble in organic solvents and even in water, are obtainable in a very simple manner by causing an alkylene oxide and a caustic alkali to act simultaneously on the carbohydrate in the presence of water at the normal temperature or at a temperature lower than room temperature and without application of pressure. Under certain conditions a somewhat higher temperature up to, for instance, 35° C. may be maintained.

As a carbohydrate we may use, for instance, potato flour, dextrine, cotton, linters, sulfite pulp, α-fiber and so on and as an alkylene oxide ethylene oxide, the homologues and analogues thereof.

Our invention is illustrated by the following examples:

*Example 1.*—160 parts by weight of potato flour are stirred at room temperature with 500 parts of water and 200 parts by weight of ethylene oxide. 50 parts by volume of caustic soda lye of 32 per cent strength are then added and stirring is continued for a further six hours. Thus is formed a glassy mass, which dissolves readily in water and is not precipitated by alcohol. The reaction product is neutralized with hydrochloric acid and evaporated to dryness. There is then obtained a light yellow powdery product which yields with water a highly viscous solution.

*Example 2.*—64 parts by weight of dextrine are stirred with 64 parts of water and 90 parts by weight of propylene oxide. 20 parts by volume of caustic soda lye of 32 per cent strength are added and stirring is continued for 8 hours at room temperature. When the reaction product can no longer be precipitated by alcohol the solution is neutralized with acetic acid and evaporated. Thus is obtained a brownish powder which is readily soluble in water and in organic solvents such as formic acid, glacial acetic acid, alcohol or monochloroethyl alcohol.

*Example 3.*—50 parts by weight of cotton are kneaded with 300 parts by weight of caustic soda lye of 20 per cent strength, the excess caustic soda is pressed out and the mass kneaded with 200 parts by weight of propylene oxide. The reaction product obtained yields with water a highly viscous solution, which is not precipitated by alcohol. The mass is dissolved in water, neutralized with hydrochloric acid and evaporated to dryness. The product thus obtainable, which is a pale yellow powder, dissolves in water and swells in organic solvents jellylikely.

*Example 4.*—3.5 kg. of alkali cellulose containing about 1200 grams of cellulose and about 2300 grams of caustic soda lye of 20 per cent strength are filled in a widenecked bottle suitably mounted on a revolving machine, then from a closed vessel suitably connected with the bottle slowly 160 ccm. of ethylene oxide are introduced in a gaseous state at a temperature of about 20° C. Thus, 1320 grams of a hydroxyethyl cellulose are obtained which is soluble, nearly free from fibers, in a caustic soda lye of 15 per cent strength. By a corresponding modification of the working conditions a hydroxyethyl cellulose of a higher stage of etherification and being completely soluble in water, is obtainable.

*Example 5.*—10 kg. of sulfite pulp are steeped into a caustic alkali solution of 18 per cent strength at 18 to 20° C., and allowed to stand until the sulfite pulp is completely impregnated. Then the mass is pressed to about 2.6 to about 2.7-fold of its original weight and comminuted in a suitable apparatus, for instance, in a Werner & Pfleiderer. The comminuted soda cellulose is then filled in a drum with five edges. Then, while rotating the drum, 2.8 kg. of propylene oxide are introduced in a gaseous state through the hollow shaft of the container. The gaseous propylene oxide is absorbed rapidly; by cooling the reacting mass and by dosing the flowing-in propylene oxide, the reaction is performed at a temperature not exceeding 35° C. The reaction mass obtained is partially neutralized on a suction filter and then washed with water until it is neutral, if necessary, with addition of methanol and acetone. It is soluble in a soda lye of about 10 per cent strength and may be separated from this solution in form of a foil by the action of a diluted acid. It may be used as a substratum in manufacturing dye pigments. Furthermore, it may be used in the manufacture of other cellulose derivatives.

*Example 6.*—α-fiber is steeped for about 4½ hours at room temperature into a soda lye solution of about 50 per cent strength and then pressed until a soda cellulose is obtained containing about 71 per cent of alkali. While cooling with ice, the soda cellulose is treated, while stirring, with such a quanitity of liquid alkylene oxide that it is always covered by the treating liquor. After 42 hours a water-soluble hydroxyethyl cellulose is obtained containing 7 to 8 hydroxyethyl groups bound by four $C_6H_{10}O_5$ groups. It may be freed from alkali by extraction with methanol.

This hydroxyethyl cellulose may be esterified in the following manner:

4 parts by weight of the hydroxyethyl cellulose obtained, are introduced into a mixture of 16 parts by weight of glacial acetic acid, 8 parts by weight of acetic acid anhydride and 1 part by weight of zinc chloride. The mixture is treated for 6 hours at a temperature of about 50 to 60° C. in a kneading machine. The reaction product is separated by addition of water and dried. A film produced from a solution of the cellulose ether-acetate obtained shows a lengthening by water of about 0.4 to about 0.5 per cent.

*Example 7.*—An alkali cellulose obtainable according to the details given in Example 6, but of a soda lye content of about 75 per cent is treated for 4 hours at a temperature of about + 1° C. with liquid ethylene oxide. After removal of the alkali, the reaction product shows only a slight capacity of swelling in water. It contains approximately one hydroxyethyl group bound by three $C_6H_{10}O_5$ groups.

The product obtained may be acetylated in a similar manner as described in the foregoing example, the esterifying process, however, being performed in 4 hours. Thus, a cellulose ether acetate is obtainable which is differentiated from the known cellulose acetates by a sensibility to water diminished to a quarter of that of the latter showing in other respects all qualities of cellulose acetate.

*Example 8.*—2 parts of a hydroxyethyl cellulose obtainable by acting during 15 hours with ethylene oxide upon an alkali cellulose at about 0° C. and containing about two hydroxyethyl groups bound by three $C_6H_{10}O_5$ groups, are introduced into a mixture containing 2 parts of acetyl chloride, 3 parts of pyridine and 7 parts of chlorobenzene and heated during 1½ hours to about 100° C. From the reaction mixture a cellulose derivative may be separated showing the same qualities as those described in Examples 6 and 7.

*Example 9.*—100 parts of α-fiber pressed into plates, are steeped for 3 to 4 hours at a temperature of 15° C. into a caustic soda solution of 25 per cent strength. Then the mass is pressed until it has a third of the weight of the product soaked with the alkali solution and comminuted in a disintegrating machine. The soda cellulose thus obtained is treated without maturing for 3 hours at 14 to 15° C. in a suitable apparatus with gaseous ethylene oxide. The reaction product is insoluble in water or at least slightly swellable. It is introduced into hot water, washed with water until it is neutral and then dried. It contains about one hydroxyethyl group bound by three $C_6H_{10}O_5$ groups.

In acetylating this product, 4 parts of the reaction mass are introduced into a mixture of 8 parts of acetic acid anhydride and 16 parts of glacial acetic acid in the presence of 1 part of zinc chloride. The esterifying mixture is heated for 3 to 4 hours to a temperature of 65 to 70° C. Thus, a cellulose ether acetate is obtainable soluble in acetone and showing excellent qualities.

*Example 10.*—75 grams of sulfite pulp are steeped at room temperature in a caustic soda lye solution of 26 per cent strength and after 6 hours pressed to 200 grams. The soda cellulose obtained is suspended in 600 ccm. of propylene oxide and is thoroughly stirred for 6 hours at a temperature of about 15 to 17° C. while cooling the reaction vessel on its outside. The cellulose hydroxypropyl ether is filtered by suction and purified by extraction with methanol diluted with water.

After drying, 4 parts of this cellulose derivative are acetylated in a mixture containing 12 parts of acetic acid anhydride, 16 parts of glacial acetic acid and 1 part of concentrated phosphoric acid. A cellulose ether-acetate is obtainable showing the same excellent qualities as those described above.

Our invention is not limited to the foregoing examples or to the specific details given therein. Thus, for instance, a carbohydrate other than cellulose as, for instance, starch or potato flour may be partly etherified to form a hydroxyalkyl ether and then be subjected to an acetylation process. Instead of introducing the radicle of acetic acid into the partly etherified cellulose, we may acylate it in an analogous manner with another aliphatic acid as, for instance, propionic acid, butyric acid, lauric acid, stearic acid, palmitic acid, oleic acid and so on. These acylating processes may be carried out without difficulties by acting upon the hydroxyethyl cellulose ether with a corresponding acid anhydride in the presence of an acylating catalyst or with a corresponding acid chloride, if necessary, in the presence of a tertiary amine such as, for instance, pyridine, triethylamine, trihydroxyethylamine and so on.

What we claim is:—

1. The process which comprises acting with an unsubstituted alkylene oxide and a caustic alkali simultaneously on a carbohydrate at ordinary pressure.

2. The process which comprises acting with an unsubstituted alkylene oxide and a caustic alkali simultaneously on a carbohydrate at ordinary pressure and acylating the partly etherified cellulose.

3. The process which comprises acting with a gaseous unsubstituted alkylene oxide and a caustic alkali simultaneously on a carbohydrate at ordinary pressure.

4. The process which comprises acting with ethylene oxide and a caustic alkali simultaneously on a carbohydrate at ordinary pressure.

5. The process which comprises acting with propylene oxide and a caustic alkali simultaneously on a carbohydrate at ordinary pressure.

6. The process which comprises acting with a gaseous unsubstituted alkylene oxide and a caustic alkali simultaneously on cellulose at ordinary pressure.

7. The process which comprises acting with ethylene oxide and a caustic alkali simultaneously upon cellulose and acylating the partially etherified product thus obtained.

8. The process which comprises acting with propylene oxide and a caustic alkali simultaneously upon cellulose and acylating the partially etherified product thus obtained.

9. The process which comprises acting with an unsubstituted alkylene oxide and a caustic alkali simultaneously upon cellulose and acetylating the partially etherified product thus obtained.

10. The process which comprises acting with ethylene oxide and a caustic alkali simultaneously upon cellulose and acetylating the partially etherified product thus obtained.

11. The process which comprises acting with propylene oxide and a caustic alkali simultaneously upon cellulose and acetylating the partially etherified product thus obtained.

In testimony whereof we affix our signatures.

MAX HAGEDORN.
WALTER ZIESE.
BERTHOLD REYLE.
RUDOLF BAUER.